United States Patent [19]

Okazaki et al.

[11] Patent Number: 5,982,437
[45] Date of Patent: Nov. 9, 1999

[54] CODING METHOD AND SYSTEM, AND DECODING METHOD AND SYSTEM

[75] Inventors: Toru Okazaki, Tokyo; Yoichi Yagasaki, Kanagawa; Yasuhiro Muramatsu, Tokyo, all of Japan

[73] Assignee: Sony Corporation, Tokyo, Japan

[21] Appl. No.: 08/136,252

[22] Filed: Oct. 15, 1993

[30] Foreign Application Priority Data

Oct. 26, 1992 [JP] Japan .................................. 4-287180

[51] Int. Cl.$^6$ .................................................. H04N 7/18
[52] U.S. Cl. ........................................ 348/413; 348/403
[58] Field of Search .................................. 348/394, 395,
348/400, 401, 402, 403, 404, 405, 419,
420, 413, 416, 409

[56] References Cited

U.S. PATENT DOCUMENTS

| | | | |
|---|---|---|---|
| 3,925,780 | 12/1975 | Van Voorhis | 348/395 |
| 4,603,347 | 7/1986 | Kuroda et al. | 348/405 |
| 4,704,628 | 11/1987 | Chen et al. | 348/404 |
| 4,797,944 | 1/1989 | Tanaka | 348/402 |
| 4,984,076 | 1/1991 | Watanabe et al. | 348/402 |
| 5,005,076 | 4/1991 | Stroppina et al. | 348/405 |
| 5,089,888 | 2/1992 | Zdepski et al. | 348/405 |
| 5,138,316 | 8/1992 | Konishi | 348/403 |
| 5,144,426 | 9/1992 | Tanaka et al. | 348/402 |
| 5,225,904 | 7/1993 | Golin et al. | 348/409 |
| 5,241,383 | 8/1993 | Chen et al. | 348/416 |
| 5,251,028 | 10/1993 | Iu | 348/402 |
| 5,295,077 | 3/1994 | Fukuoka | 348/420 |

FOREIGN PATENT DOCUMENTS

| | | |
|---|---|---|
| 0 469 835 | 2/1992 | European Pat. Off. . |
| 0469835 | 2/1992 | European Pat. Off. . |
| 0 542 474 | 5/1993 | European Pat. Off. . |
| 0542474 | 5/1993 | European Pat. Off. . |

OTHER PUBLICATIONS

International Organisation for Standardization—ISO/IEC JTC1/SC2/WG11, Nov. 13, 1991 pp. 1–74 Source; Matsushita 'MPEG Document 91/217' p. 3, line 1–line 8, section 2.13 on p. 13.
Patent Abstracts of Japan, vol. 14, No. 553 (E–1010) Dec. 7, 1990, JP–A–02 237 368 (Sharp Corp.) Sep. 19, 1990.
Patent Abstracts of Japan vol. 16, No. 475 (E–1273) Oct. 2, 1992, JP–A–04 170 187 (Olympus Optical Co. Ltd) abstract.
IEEE Transactions on Consumer Electronics, vol. 38, No. 1, Feb. 1992, New York US pp. XVIII–XXXIV G. Wallace 'The JPEG still picture compression standard' p. XXIII, left column, line 26–line 36; figures 1,2.
Patent Abstracts of Japan, vol. 14, # 553 (E–1010) Dec. 7, 1990, JP–A–02 237 368 (Sharp Corp.), Sep. 19, 1990.
Patent Abstracts of Japan, vol. 16, # 475(E–1273) Oct. 2, 1992, JP–A–04 170 187 (Olympus Optical) Abstract.

*Primary Examiner*—Anand S. Rao
*Attorney, Agent, or Firm*—Frommer Lawrence & Haug, LLP; William S. Frommer

[57] ABSTRACT

A coding method, decoding method, coding system, and decoding system for efficiently variable length coding and variable length decoding quantized data compared with existing ones. Input data is variable length coded by using a variable length coding table 23C or 23D selected among a plurality of variable length coding tables 23C and 23D prepared in accordance with a coding efficiency. Thereby, it is possible to further improve a variable length coding efficiency compared with a case for using only one variable length coding table. As a result, when generating information content equal to that generated by using only one variable length coding table, it is possible to process data quantized with smaller quantized size and further improve the quality of information transmitted as coded data.

15 Claims, 20 Drawing Sheets

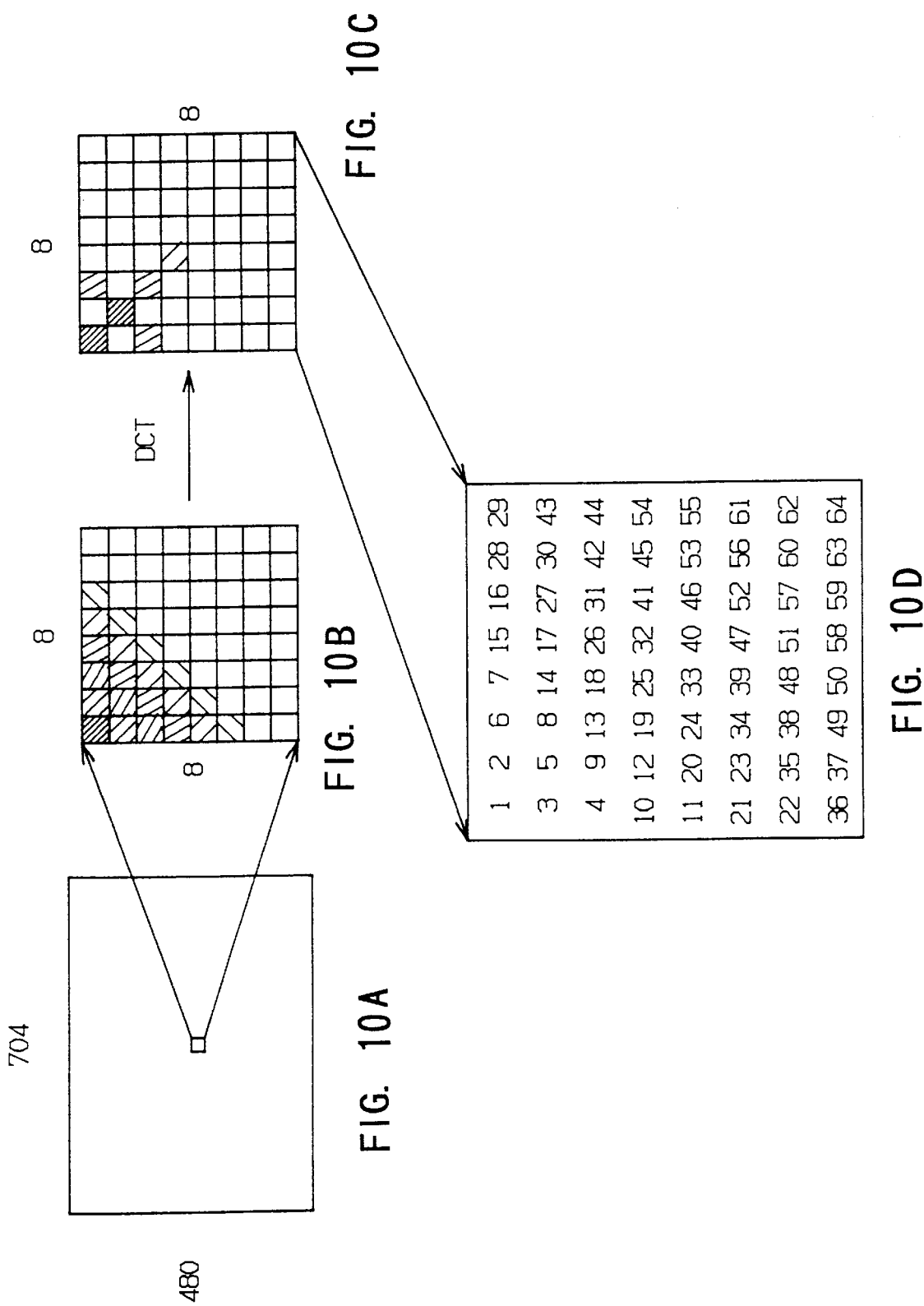

ZIGZAG SCAN →

FIG. 11C $$\begin{pmatrix} (0,20),(0,3),(1,5),(0,1),(3,-1), \\ (0,2),(0,1),(1,3),(5,1),(0,1), \\ (0,-1),(EndOfBlock) \end{pmatrix}$$

→ TWO DIMENTIONAL VLC

| VLC Code | run | level |
|---|---|---|
| 10 | EOB | |
| 11 | 0 | 1 |
| 011 | 1 | 1 |
| 0100 | 0 | 2 |
| 0101 | 2 | 1 |
| 00101 | 0 | 3 |
| 00111 | 3 | 1 |
| 00110 | 4 | 1 |
| 000110 | 1 | 2 |
| 000111 | 5 | 1 |
| 000101 | 6 | 1 |
| 000100 | 7 | 1 |
| 000110 | 0 | 4 |
| 0000100 | 2 | 2 |
| 0000111 | 8 | 1 |
| 0000101 | 9 | 1 |
| 000001 | Escape | |
| 00100110 | 0 | 5 |
| 00100001 | 0 | 6 |
| 00100101 | 1 | 3 |
| 00100100 | 3 | 2 |
| 00100111 | 10 | 1 |
| 00100011 | 11 | 1 |
| 00100010 | 12 | 1 |
| 00100000 | 13 | 1 |

FIG. 12 level

| run | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | 0 | 3 | 5 | 6 | 8 | 9 | 9 | 11 | 13 | 13 | 13 | 13 | 14 | 14 | 14 | 14 |
| | 1 | 4 | 7 | 9 | 11 | 13 | 14 | 14 | 16 | 16 | 16 | 16 | 16 | 16 | 16 | 17 |
| | 2 | 5 | 8 | 11 | 13 | 14 | 20 | 20 | 20 | 20 | 20 | 20 | 20 | 20 | 20 | 20 |
| | 3 | 6 | 9 | 13 | 14 | 20 | 20 | 20 | 20 | 20 | 20 | 20 | 20 | 20 | 20 | 20 |
| | 4 | 6 | 11 | 13 | 20 | 20 | 20 | 20 | 20 | 20 | 20 | 20 | 20 | 20 | 20 | 20 |
| | 5 | 7 | 11 | 14 | 20 | 20 | 20 | 20 | 20 | 20 | 20 | 20 | 20 | 20 | 20 | 20 |
| | 6 | 7 | 13 | 17 | 20 | 20 | 20 | 20 | 20 | 20 | 20 | 20 | 20 | 20 | 20 | 20 |
| | 7 | 7 | 13 | 20 | 20 | 20 | 20 | 20 | 20 | 20 | 20 | 20 | 20 | 20 | 20 | 20 |
| | 8 | 8 | 13 | 20 | 20 | 20 | 20 | 20 | 20 | 20 | 20 | 20 | 20 | 20 | 20 | 20 |
| | 9 | 8 | 14 | 20 | 20 | 20 | 20 | 20 | 20 | 20 | 20 | 20 | 20 | 20 | 20 | 20 |
| | 10 | 9 | 14 | 20 | 20 | 20 | 20 | 20 | 20 | 20 | 20 | 20 | 20 | 20 | 20 | 20 |
| | 11 | 9 | 17 | 20 | 20 | 20 | 20 | 20 | 20 | 20 | 20 | 20 | 20 | 20 | 20 | 20 |
| | 12 | 9 | 17 | 20 | 20 | 20 | 20 | 20 | 20 | 20 | 20 | 20 | 20 | 20 | 20 | 20 |
| | 13 | 9 | 17 | 20 | 20 | 20 | 20 | 20 | 20 | 20 | 20 | 20 | 20 | 20 | 20 | 20 |
| | 14 | 11 | 17 | 20 | 20 | 20 | 20 | 20 | 20 | 20 | 20 | 20 | 20 | 20 | 20 | 20 |
| | 15 | 11 | 17 | 20 | 20 | 20 | 20 | 20 | 20 | 20 | 20 | 20 | 20 | 20 | 20 | 20 |
| | 16 | 11 | 17 | 20 | 20 | 20 | 20 | 20 | 20 | 20 | 20 | 20 | 20 | 20 | 20 | 20 |
| | 17 | 13 | 20 | 20 | 20 | 20 | 20 | 20 | 20 | 20 | 20 | 20 | 20 | 20 | 20 | 20 |
| | 18 | 13 | 20 | 20 | 20 | 20 | 20 | 20 | 20 | 20 | 20 | 20 | 20 | 20 | 20 | 20 |
| | 19 | 13 | 20 | 20 | 20 | 20 | 20 | 20 | 20 | 20 | 20 | 20 | 20 | 20 | 20 | 20 |
| | 20 | 13 | 20 | 20 | 20 | 20 | 20 | 20 | 20 | 20 | 20 | 20 | 20 | 20 | 20 | 20 |
| | 21 | 13 | 20 | 20 | 20 | 20 | 20 | 20 | 20 | 20 | 20 | 20 | 20 | 20 | 20 | 20 |
| | 22 | 14 | 20 | 20 | 20 | 20 | 20 | 20 | 20 | 20 | 20 | 20 | 20 | 20 | 20 | 20 |
| | 23 | 14 | 20 | 20 | 20 | 20 | 20 | 20 | 20 | 20 | 20 | 20 | 20 | 20 | 20 | 20 |
| | 24 | 14 | 20 | 20 | 20 | 20 | 20 | 20 | 20 | 20 | 20 | 20 | 20 | 20 | 20 | 20 |
| | 25 | 14 | 20 | 20 | 20 | 20 | 20 | 20 | 20 | 20 | 20 | 20 | 20 | 20 | 20 | 20 |
| | 26 | 14 | 20 | 20 | 20 | 20 | 20 | 20 | 20 | 20 | 20 | 20 | 20 | 20 | 20 | 20 |

FIG. 13

| VLC Code | run | level |
|---|---|---|
| 11 | 0 | 1 |
| 101 | 0 | 2 |
| 110 | 1 | 1 |
| 0111 | EOB | |
| 0110 | 0 | 3 |
| 01011 | 0 | 4 |
| 01010 | 0 | 5 |
| 01001 | 1 | 2 |
| 01000 | 2 | 1 |
| 00111 | 3 | 1 |
| 001101 | 0 | 6 |
| 001100 | 0 | 7 |
| 001011 | 4 | 1 |
| 001010 | 5 | 1 |
| 0010011 | 0 | 8 |
| 0010010 | 0 | 9 |
| 0010001 | 1 | 3 |
| 0010000 | 2 | 2 |
| 0001111 | 6 | 1 |
| 0001110 | 7 | 1 |
| 0001101 | 8 | 1 |
| 0001100 | 9 | 1 |
| 0001011 | 10 | 1 |
| 00010101 | Escape | |
| 00010100 | 0 | 10 |
| 00010011 | 0 | 11 |
| 00010010 | 0 | 12 |
| 00010001 | 0 | 13 |
| 00010000 | 1 | 4 |
| 00001111 | 3 | 2 |
| 00001110 | 11 | 1 |
| 00001101 | 12 | 1 |
| 00001100 | 13 | 1 |

FIG. 14

| run \ level | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|
| 0 | 3 | 4 | 5 | 6 | 6 | 7 | 7 | 8 | 8 | 9 | 9 | 9 | 9 | 9 | 10 | 10 | 10 | 11 | 11 | 11 | 11 | 11 | 12 | 12 | 12 | 12 | 12 | 12 | 13 | 13 | 13 | 13 | 13 |
| 1 | 4 | 6 | 8 | 9 | 10 | 11 | 11 | 12 | 13 | 13 | 13 | 14 | 14 | 14 | 15 | 15 | 16 | 16 | 16 | 16 | 16 | 17 | 17 | 17 | 17 | 17 | 17 | 17 | 17 | 22 | 22 | 22 | 22 |
| 2 | 5 | 8 | 10 | 12 | 13 | 14 | 15 | 15 | 16 | 17 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 3 | 6 | 9 | 11 | 13 | 14 | 15 | 16 | 17 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 4 | 6 | 10 | 12 | 14 | 15 | 16 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 5 | 7 | 11 | 13 | 15 | 16 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 6 | 7 | 11 | 13 | 15 | 16 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 7 | 8 | 12 | 14 | 15 | 16 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 8 | 8 | 12 | 14 | 15 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 9 | 8 | 12 | 14 | 16 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 10 | 8 | 12 | 14 | 16 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 11 | 9 | 13 | 15 | 16 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 12 | 9 | 13 | 15 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 13 | 9 | 13 | 15 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 14 | 10 | 14 | 16 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 15 | 11 | 17 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 16 | 12 | 17 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 17 | 12 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 18 | 13 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 19 | 13 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 20 | 13 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 21 | 13 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 22 | 13 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| 23 | 13 | 17 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |

FIG. 15

CODING METHOD AND SYSTEM, AND DECODING METHOD AND SYSTEM

BACKGROUND OF THE INVENTION

1. Field of the Invention

This invention relates to a coding method and a coding system, and a decoding method and a decoding system, and is applicable to for example, a variable length coding method and a variable length coding system as well as a variable length decoding method and a variable length decoding system for orthogonally transformed picture signals.

2. Description of the Related Art

Heretofore, there have been constructed video signal transmission systems for transmitting video signals representing motion pictures to remote places, such as a video conference system and videophone. In the video signal transmission systems, video signals are coded by using the line correlation and inter frame correlation of the video signals in order to efficiently use a transmission path, thereby improving the transmission efficiency of significant information.

For example, intra frame coding uses the line correlation of video signals. Therefore, as shown in FIGS. 1A and 1B, when transmitting pictures PC1, PC2, PC3, ... at time points $t=t_1, t_2, t_3, \ldots$, constituting a motion picture sequence, the picture data to be transmitted is one-dimensionally coded in the same scanning line before transmission thereof.

Inter frame coding improves compressibility by using the inter frame correlation of video signals to obtain picture data PC12, PC23, ... having differences in pixel data between successively adjacent pictures PC1 and PC2, PC2 and PC3, ....

Thereby, the video signal transmission system is constituted to code the picture data for pictures PC1, PC2, PC3, ..., with high efficiency into digital data of much less quantity than the uncoded picture data, and to send the digital data to a transmission path.

FIG. 2 shows how a picture sequence is intra frame coded or inter frame coded and transformed into three types of frames (macroblock) such as an intra frame predicted frame, frame, and forward, backward, and bidirectional inter frame predicted frame. In FIG. 2, 15 frame periods (frames F0 to F14) are used as one unit for coding.

For this example, the frame F2 is intra frame coded and is called "an intra picture". The frames F5, F8, F11, and F14 are predicted only from the frames F2, F5, F8, and F11 located ahead of the above frames respectively, and are called "predicted pictures".

The remaining frames F0, F1, F3, F4, F6, F7, F9, F10, F12, and F13 are predicted by frames located ahead of the above frames, those located behind the above frames, or those located at the both sides of the above frames as well as inter frame coded, and are called "bidirectional pictures".

FIG. 3 shows a video signal transmission system. The video signal transmission system 1 has a coding device 1A for transmitting data and a decoding device 1B for receiving coded data.

After the coding device 1A converts an input video signal VD via a preprocessing circuit 2 into a luminance signal SY and color difference signal SC, these are converted into an 8-bit digital luminance signal DY and color difference signal DC by the analog to digital conversion circuits 3 and 4.

Then, in the coding device 1A the digital luminance signal DY and digital color difference signal DC are written into a luminance signal frame memory 5A and color difference signal frame memory 5B of a frame memory 5, respectively, and thereafter the picture data is transformed from a frame format into a block format in a format conversion circuit 6.

In the coding device 1A the picture data transformed into the block format is input to an encoder 7, and the picture data is highly efficiently coded to generate a bit stream which is transmitted to a decoding device 1B via a communication path and recording media 8.

The encoder 7 is composed of a hybrid coder 7A for discrete cosine transforming the intra frame or inter frame coded (forward, backward, or bidirectional predicted) picture data, and thereafter quantizing the picture data, as well as a variable length coding apparatus 7B for variable length coding and outputting the quantized data.

The decoding device 1B decodes the bit stream taken from the recording media 8 by performing an inverse procedure to the coding device 1A. That is, the decoding device 1B inverse transforms the bit stream decoded by a decoder 9 so as to restore it, and transforms it from the block format into the frame format in a format transform circuit 10.

Then, in the decoding device 1B the digital luminance signal DY and digital color difference signal DC transformed into the frame format are written into a luminance signal frame memory 11A and a color difference signal frame memory 11B, respectively.

Thereafter, in the decoding device 1B, the above signals are converted into analog signals SY and SC via digital to analog conversion circuits 12 and 13, and the decoding device 1B inputs the signal to a post processing circuit 14 to obtain an output picture and output it as an output video signal VO.

The video signal transmission system 1 is constituted so as to transmit or receive data through a series of such processes.

In this connection, the video signal transmission system 1 processes the data of a frame picture in the structure shown in FIGS. 4A to 4C. First, the data for a frame picture is divided into N slices as shown in FIG. 4A. Each slice includes M macroblocks as shown in FIG. 4B and each macroblock includes luminance signal data Y1 to Y4 corresponding to 8×8 pixels and color difference data Cb and Cr corresponding to the total pixel data as shown in FIG. 4C.

In this case, the picture data stream in each slice is arranged so that picture data follows in macroblocks of 16×16 pixels, and also follows in microblocks of 8×8 pixels in each macroblock in order of raster scanning.

The macroblock uses picture data (Y1 to Y4) for 16×16 pixels following in the horizontal and vertical scanning directions for a luminance signal as one unit, but uses one microblock Cr or Cb assigned to the data for 16×16 pixels as a unit, because the data quantity is decreased and thereafter time base multiplexed for two color difference signals corresponding to the picture data (Y1 to Y4) for 16×16 pixels.

For the coding device 1A, only one type of variable length coding (VLC) apparatus 7B of the encoder 7 for high efficiency coding picture data is given as a conversion table (hereinafter referred to as "VLC table") used for variable length coding quantized data independent of the type of picture processed. For the encoder 7 based on MPEG1 (Moving Picture Experts Group 1), for example, the VLC table is constituted in accordance with the quantized data generated through inter frame coding.

However, the quantization data generated by inter frame coding does not always have the same frequency distribution as the quantization data generated by intra frame coding. That is, when considering the quantized data generated by intra frame coding as a macroblock, it is very similar to the quantized data generated by inter frame coding in composition, but a considerably large difference is found between them in the overall composition (or inclination). Therefore, a high efficiency coding cannot be expected merely from directly applying the VLC table prepared for inter frame coding when processing the quantized data generated through intra frame coding.

SUMMARY OF THE INVENTION

In view of the foregoing, an object of this invention is to provide a coding method with a higher coding efficiency than conventional ones as well as its coding system, and to provide a decoding method for decoding the data thus coded as well as its decoding system.

The foregoing object and other objects of this invention have been achieved by the provision of a coding method for variable length coding quantized input data in predetermined blocks (e.g. in macroblocks), in which input data is variable length coded by using any one of a plurality of given variable length coding tables 23C and 23D which is selected in accordance with the coding efficiency.

Moreover, this invention uses a coding apparatus for variable length coding quantized input data in predetermined blocks (e.g. in macroblocks), the coding apparatus comprising: a plurality of variable length coding tables 23C and 23D assigned with different sign lengths; a coded information generating means 22 for designating the change of variable length coding tables used for variable length coding input data in accordance with a coding efficiency; and a coding means 23A and 23B for variable length coding input data by using any one of the variable length coding tables 23C and 23D, which is selected in accordance with the coded information outputted from the coded information generating means 22.

Furthermore, this invention uses a decoding method for variable length decoding coded data inputted by a recording medium or transmission path in predetermined blocks (e.g. in macroblocks), in which a variable length coding table identical to the variable length coding table 23C or 23D used when coded data is generated is selected among a plurality of given variable length coding tables 32C and 32D and coded data is variable length decoded by using the variable length coding table 32C or 32D.

Furthermore, this invention uses a decoding apparatus for variable length decoding coded data inputted through a recording medium or transmission path in predetermined blocks (e.g. in macroblocks), the decoding apparatus comprising: a plurality of variable length coding tables 32C and 32D assigned to different sign lengths; a switching means 32B for selecting a variable length coding table identical to the variable length coding table 23C or 23D used when the coded data is generated is selected among a plurality of variable length coding tables 32C and 32D in accordance with coded information extracted from coded data; and decoding means 32A for variable length decoding coded data by using the variable length coding table 32C or 32D selected by the switching means 32B.

It is possible to further improve the variable length coding efficiency compared with the case in specifying one variable length coding table by using the variable length coding table 23C or 23D selected among a plurality of given variable length coding tables 23C and 23D based on a coding efficiency and variable length coding input data. Upon thereby generating information content identical to the content when specifying one variable length coding table, it is possible to process data quantized in a smaller quantization size and further improve the quality of information to be transmitted as coded data.

According to this invention, it is possible to further improve the variable length coding efficiency by variable length coding input data with a variable length coding table selected in accordance with the coding efficiency among a plurality of variable length coding tables prepared compared with the case for performing variable length coding with only one variable length coding table.

Thereby, when generating the information content equal to that generated by using one variable length coding table, it is possible to select a smaller quantized size and further improve the quality of the information transmitted as coded data.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 10A to 10D are schematic diagrams showing a DCT coefficient scanning procedure;

FIGS. 11A to 11C are schematic diagrams for explaining quantized data having two-dimensional data of runs and levels;

FIG. 12 is a chart showing a VLC table for inter frame coding;

FIG. 13 is a chart showing assignment of bits in accordance with a VLC table for inter frame coding;

FIG. 14 is a chart showing a VLC table for intra frame coding;

FIG. 15 is a chart showing assignment of bits in accordance with a VLC table for intra frame coding;

DETAILED DESCRIPTION OF THE EMBODIMENT

Preferred embodiments of this invention will be described with reference to the accompanying drawings:

(1) First embodiment (1-1) Constitution of encoder

Figure 5:
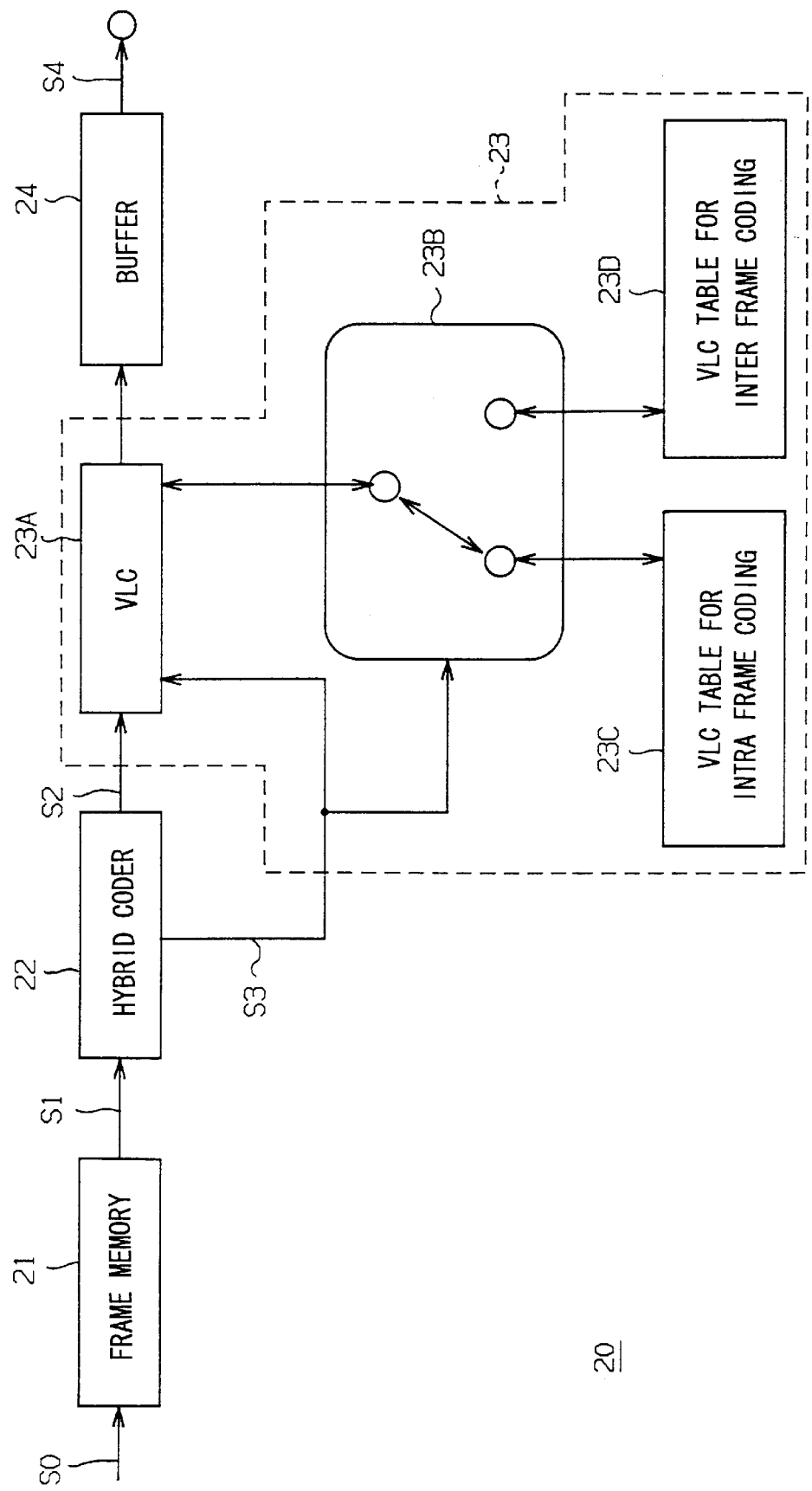
FIG. 5 is a block diagram showing an embodiment of the coding system using the variable length coding apparatus of this invention.

In FIG. 5, 20 represents an encoder constituting a motion picture coding apparatus as a whole, which is characterized by using two types of variable length coding tables corresponding to the coding system to improve a coding efficiency. A frame memory 21 fetches input picture signals S0 in order and supplies picture data S1 to be processed at present in macroblocks to a hybrid coder 22.

The hybrid coder 22 predictively codes the picture data S1 using motion compensation and thereafter hybrid codes the picture data S1 by using an orthogonal transformation such as a discrete cosine transform (DCT).

The hybrid coder 22 supplies picture information to a variable length coding (VLC) section 23 as a quantized signal S2 and control information to it as a picture coding control signal S3 among processed results obtained by hybrid coding.

The VLC section 23 inputs the quantized signal S2 to a VLC circuit 23A and the picture coding control signal S3 to a VLC circuit 23A and a table changer 23B. In this connection, the quantized signal S2 has a DCT coefficient which is a movement compensation predicted error signal in a macroblock layer and run length information and the picture coding control signal S3 has control information including movement vector, macroblock type (presence or absence of movement compensation mode and DCT coefficient), and DCT mode.

The VLC circuit 23A variable length codes the DCT coefficient inputted as the quantized signal S2 based on two conversion tables (that is, the VLC table 23C for intra frame coding and the VLC table 23D for inter frame coding).

Figure 6:
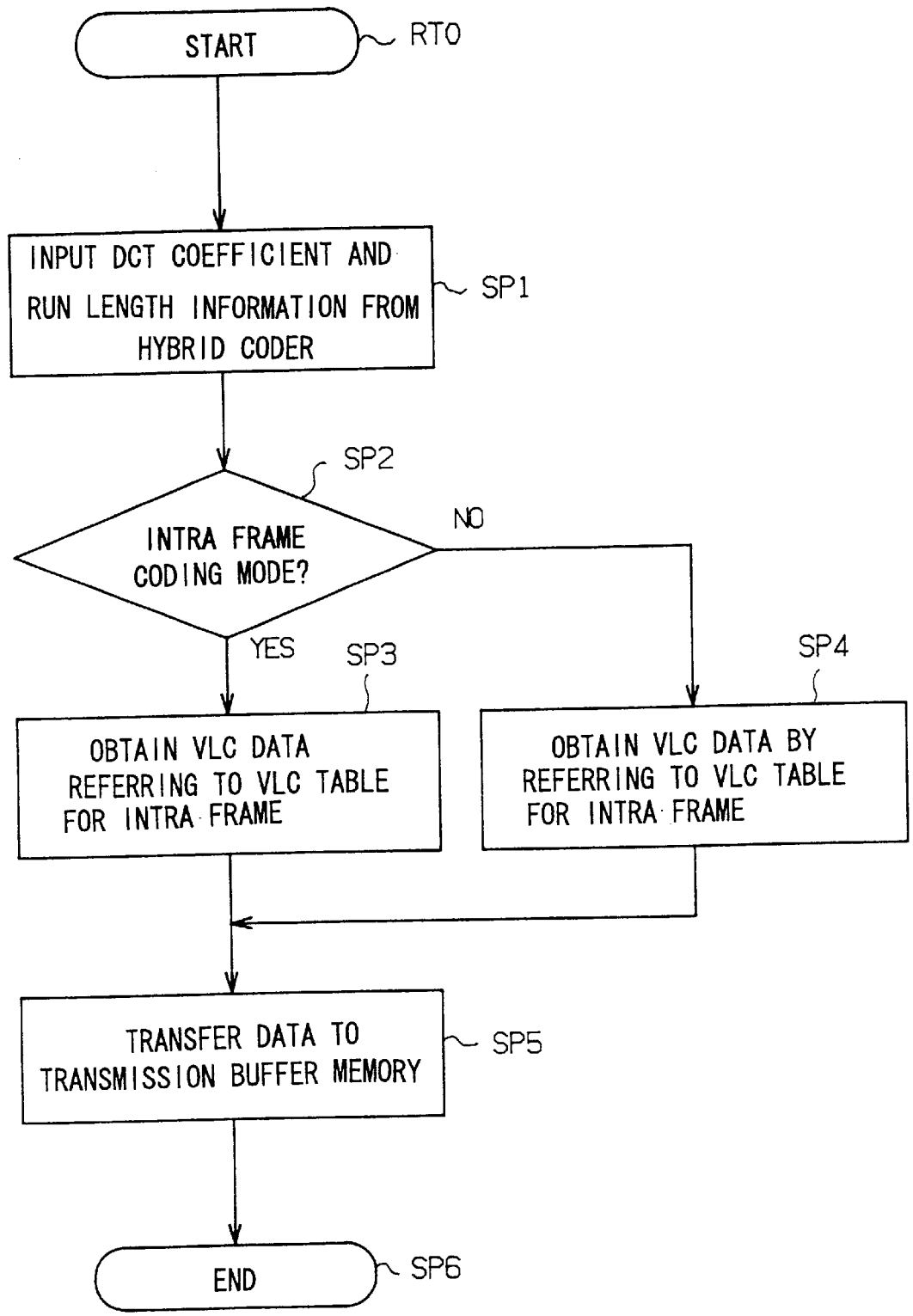
FIG. 6 is a flow chart for explaining a variable length coding procedure.

The movement compensation mode signal inputted as the picture coding control signal S3 and indicating one of intra frame and inter frame predictive coding is used to select one of the two conversion tables in the VLC circuit 23A. Selecting the two conversion tables is described below by referring to FIG. 6.

First, the VLC circuit 23A starts with a processing routine RT0. When the VLC circuit 23A inputs the DCT coefficient and run length information from the hybrid coder 22 in the step SP1, it judges if the picture data to be processed is an intra frame coding mode or not in the next step SP2.

If so, the VLC circuit 23A proceeds to the step SP3 and references the VLC table 23C for intra frame coding to obtain corresponding variable length coded data. If not, the VLC circuit 23B proceeds to the step SP4 and references the VLC table 23D for inter frame coding to obtain corresponding variable length coded data.

Then, the VLC circuit 23A transfers the variable length coded data obtained by reference to each table to a buffer memory 24 for transmission (step SP5) and then terminates all processing (step SP6).

Thereby, the VLC circuit 23 variable length codes quantized data together with a quantizing step size and macroblock (movement compensation mode) and supplies it to the transmission buffer memory 24 as transmission data.

The buffer memory 24 stores the data thus variable length coded and thereafter outputs the data as a bit stream at a certain transmission rate.

In this case, the buffer memory 24 returns quantization control signals in macroblocks to a quantization circuit based on the data quantity remaining in the memory so as to control the quantizing step size. The buffer memory 24 thereby adjusts the data quantity generated as a bit stream to keep the data in the memory at a proper quantity (a data quantity causing no overflow or underflow).

That is, when the quantity of remaining data increases up to the allowable upper limit, the buffer memory 24 decreases the quantity of quantized data by increasing the quantizing step size of the quantization circuit with the quantization control signal. However, when the quantity of remaining data decreases down to the allowable lower limit, the buffer memory 24 increases the quantity of quantized data by decreasing the quantizing step size of the quantization circuit with the quantization control signal.

(1-2) Constitution of hybrid coder

Figure 7:
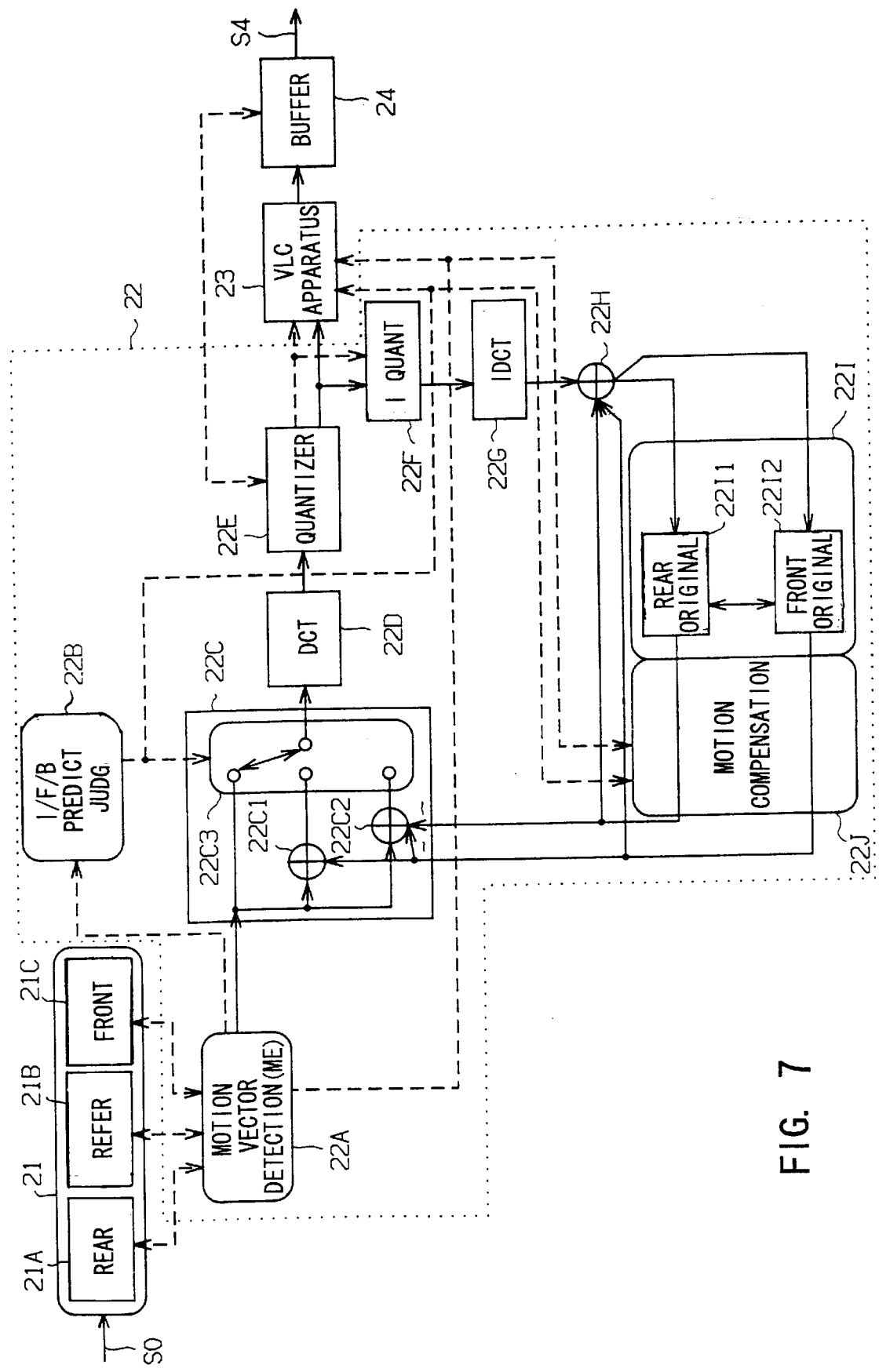
FIG. 7 is a block diagram showing a hybrid coder.

Signal processing of the hybrid coder 22 is described below by referring to FIG. 7.

The hybrid coder 22 supplies a block format picture to a motion vector detection circuit 22A through the frame memory 21 to detect a motion vector.

Figure 1:
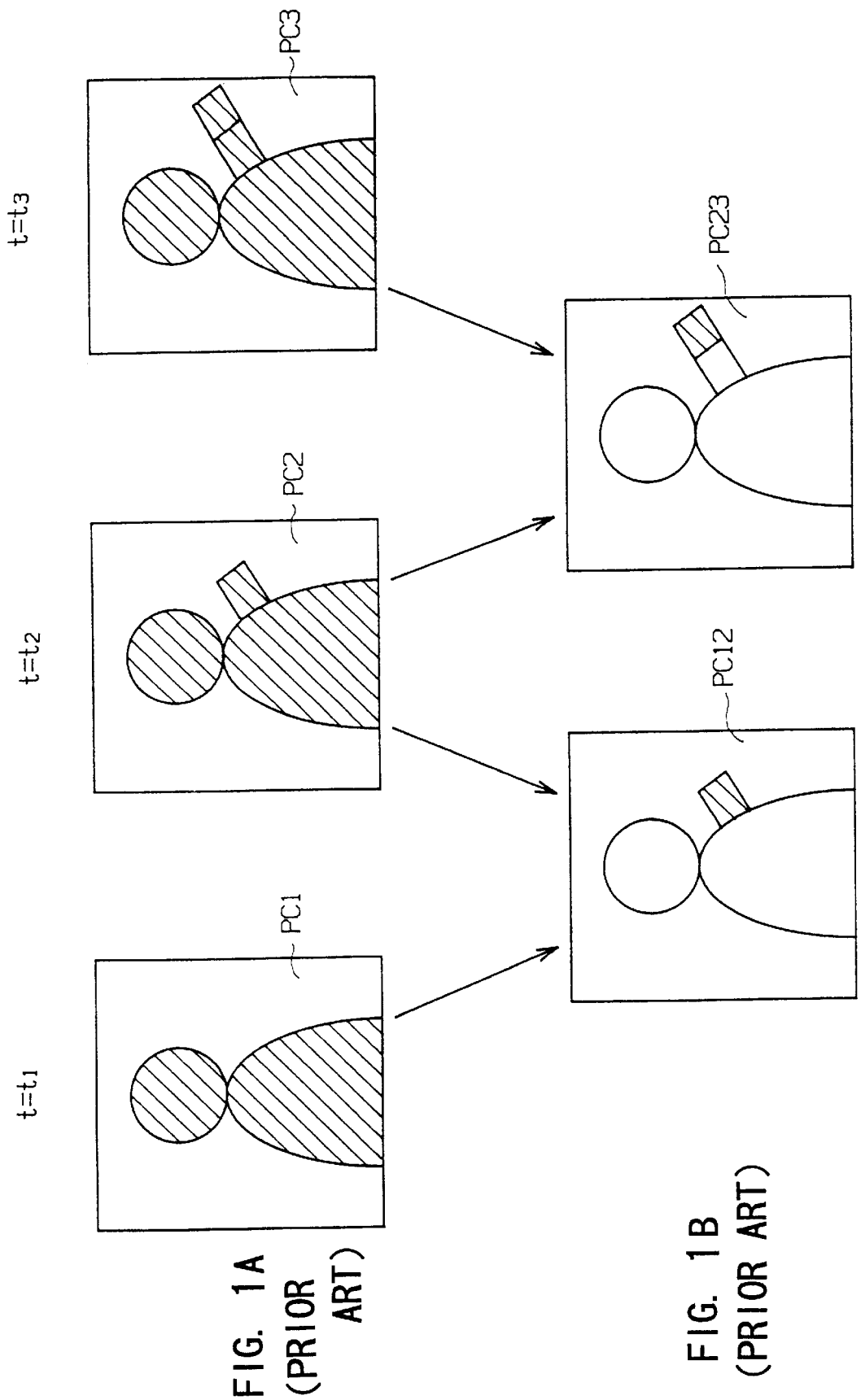
FIGS. 1A and 1B are schematic diagrams for explaining inter frame coding.
Figure 2:
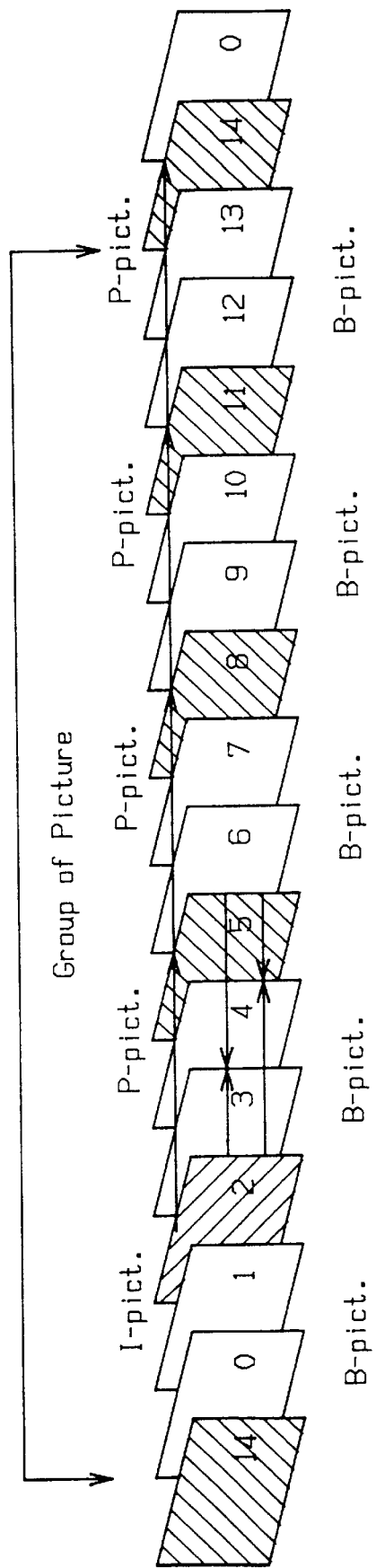
FIG. 2 is a schematic diagram showing a picture structure in a picture sequence.
Figure 3:
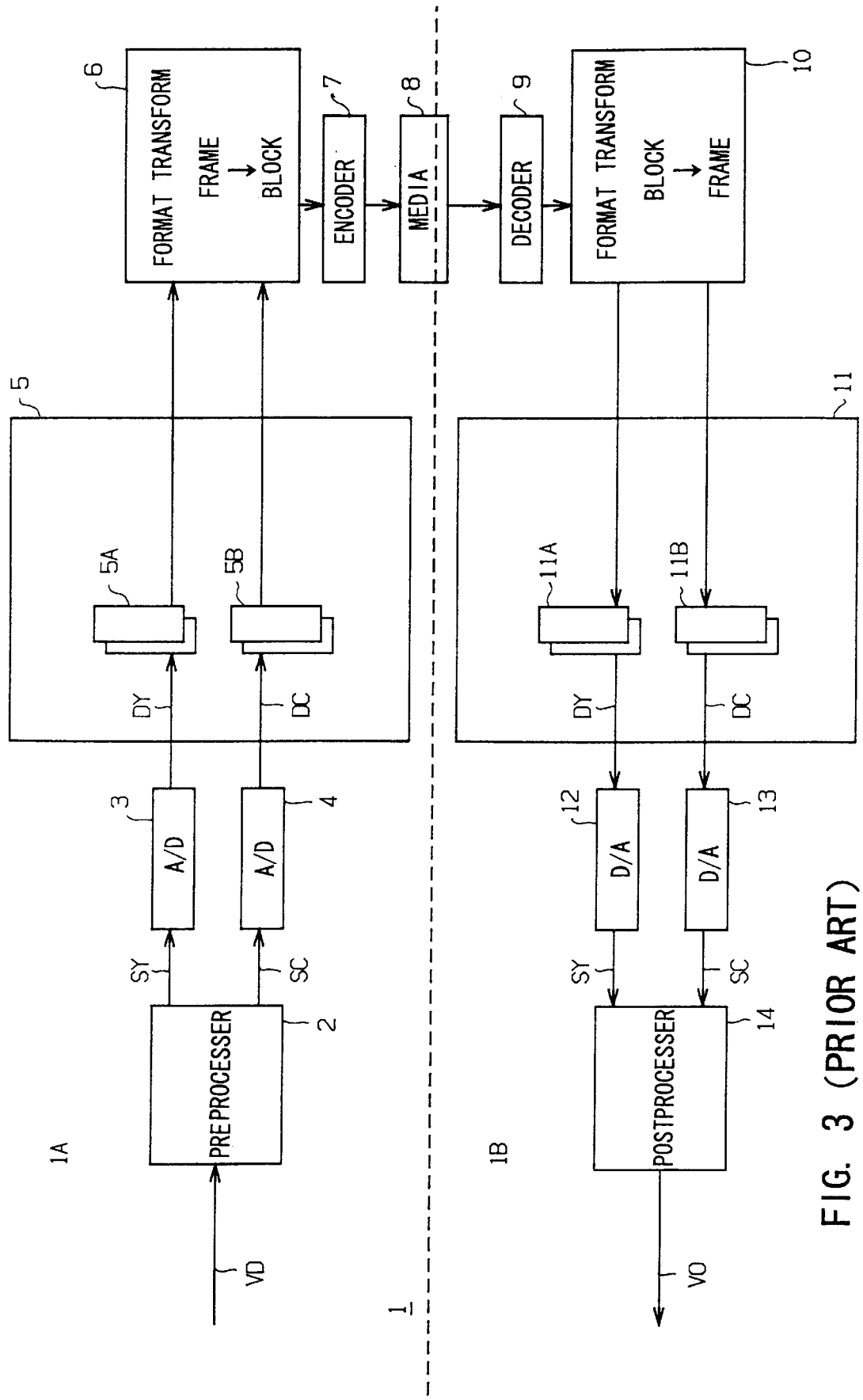
FIG. 3 is a block diagram showing a video signal transmission system.
Figure 4:
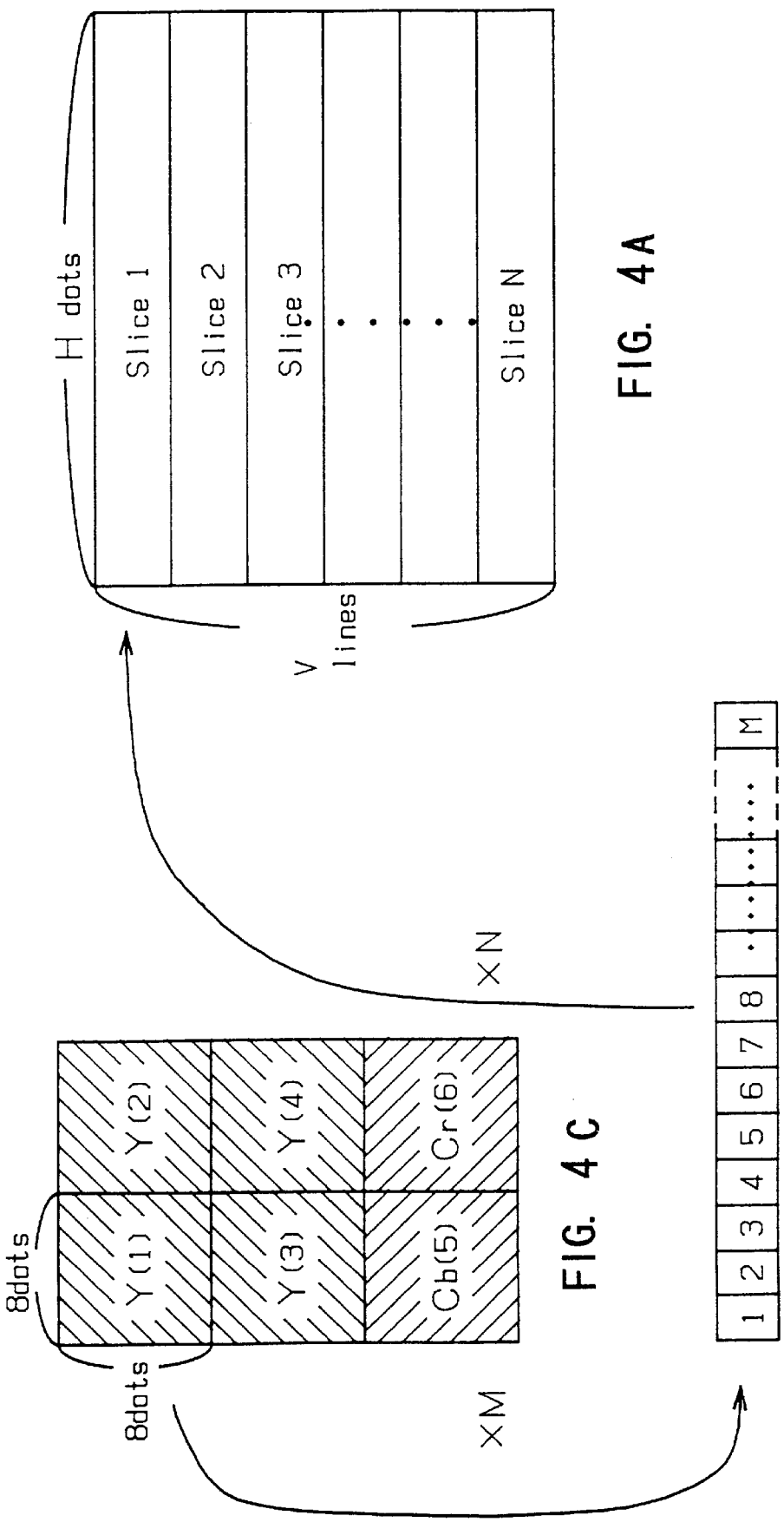
FIGS. 4A to 4C are schematic diagrams showing a hierarchical structure of picture data.

The motion vector detection circuit 22A, as already described in FIG. 2, generates an interpolation picture by using a noninterpolation frame (that is, intra frame predicted frame) as a predicted picture and using the detected motion vector.

In this case, the motion vector detection circuit 22A processes the picture data for each frame as an intra picture, predicted picture, or bidirectional picture based on previously set predetermined sequences.

The frame memory 21 stores the picture data for each frame in a front original picture memory section 21A, reference original picture memory section 21B, or rear original picture memory section 21C in accordance to these predetermined sequences.

The motion vector detection circuit 22A reads a reference picture DATA and predicted picture DATA (that is, front original picture and rear original picture) from the original picture memory sections 21A to 21C to detect the motion vector for each block. At this time, the motion vector detection circuit 22A uses the minimum value among the absolute value sums of inter frame differences to detect the best matching block relative to a reference block and to generate a motion vector between the best matching and reference blocks.

The motion vector detection circuit 22A transmits the absolute value sums of inter frame differences obtained in blocks to an intra frame/forward/bidirectional predicted judgment circuit 22B.

The intra frame/forward/bidirectional predicted judgment circuit 22B determines the frame type of a reference block along with the absolute value sums and exchanges the processes of an operation section 22C in macroblocks in accordance with the determined frame type.

In the case of an intra frame coded frame, the operation section 22C outputs a picture inputted from the motion vector detection circuit 22A through a switching circuit 22C3.

For a forward predicted coded frame or bidirectional predicted coded frame, a subtracter 22C1 or 22C2 generates intra frame coded data from a predicted picture and outputs the differential data through the switching circuit 22C3.

After a discrete cosine transform (DCT) circuit 22D inputs intra frame coded or inter frame coded picture data from a computing unit 22C, it discrete cosine transforms the input picture data or differential data in blocks by using two dimensional correlation of video signals.

A quantizer 22E quantizes the DCT coefficient obtained by transforming a macroblock and a quantizing step size determined for each slice and outputs the quantized data obtained through the quantization at an output terminal to a variable length coding section 23.

In this connection, the quantizing step size of the quantizer 22E is determined to a value so as not to exceed the capacity of a transmission by returning the remaining capacity of the transmission buffer. The quantizing step size is also outputted to the variable length coding circuit 23.

The hybrid coder 22 inputs the quantized data and quantizing step size to be outputted to the variable length coding section 23 to an inverse quantizer 22F to start local decoding.

The inverse quantizer 22F decodes the data from the quantizer 22E by inversely quantizing the quantized data into inversely quantized data and supplies the inversely quantized data to an inverse discrete cosine transform (IDCT) circuit 22G.

The IDCT circuit 22G transforms the inversely quantized data decoded by the inverse quantization circuit 22F into decoded picture data by a transform processing inverse to that of the DCT circuit 22D and inputs it to a computing unit 22H.

Data same as the predicted picture data supplied to the computing unit 22C is supplied to the computing unit 22H so as to add the predicted picture data outputted by a motion compensation circuit 22J to the differential data outputted by the IDCT circuit 22G.

Thereby, picture data for the original (restored) predicted picture and picture data for the original (restored) intra picture are obtained and stored in a rear original picture memory section 22I1 and a front original picture memory section 22I2 of a frame memory 22I respectively.

After the picture data is stored in the rear original picture memory section 22I1 and front original picture memory section 22I2 respectively, the motion vector detection circuit 22A starts the next picture processing.

The motion compensation circuit 22J generates predicted picture data by using the picture data stored in the original picture memory sections 22I1 and 22I2 in accordance with the frame type determined by the intra frame/forward/bidirectional predicted judgment circuit 22B.

That is, for the backward predicted frame, the motion compensation circuit 22J sends a read address deviated by a value corresponding to a motion vector from a position corresponding to the position of a block to be inputted to the operating unit 22C to the rear original picture memory section 22I1 and generates predicted picture data.

For the bidirectional predicted frame, however, the motion compensation circuit 22J sends a read address deviated by a value corresponding to a motion vector from a position corresponding to the position of a block to be inputted to the operating unit 22C to the rear original picture memory sections 22I1 and 22I2 and generates predicted picture data.

(1-3) Variable length coding table

The following is the description of two types of coding tables prepared to efficiently code the quantized data S2 supplied from the hybrid coder 22 to the VLC apparatus 23.

The VLC apparatus 23 improves the coding efficiency by varying the symbol length, also referred to herein as sign length, of quantized data coded in accordance with a combination of 0-run length (run length) with a quantized data level depending on a generation frequency. For this example, the VLC table 23C for intra frame coding and VLC table 23D for inter frame coding are prepared.

This is because intra frame coded quantized data and inter frame coded quantized data are different from each other in the frequency distributions of run lengths and data levels.

Figure 8:
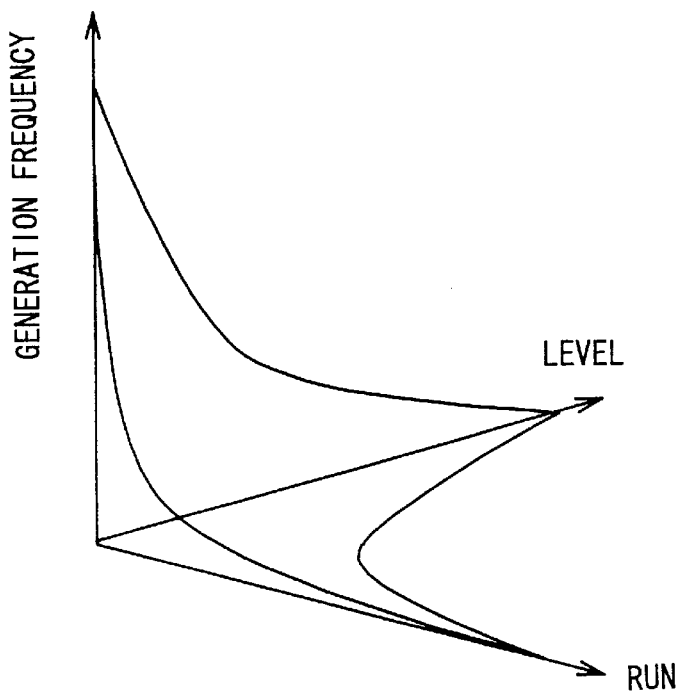
FIG. 8 is a frequency distribution diagram showing the generation frequency of quantized data obtained through intra frame coding.

That is, the intra frame coded quantized data is concentrated on a low frequency component because intra frame coding discrete cosine transforms a pattern itself. Therefore, a run length tends to comparatively decrease and a level tends to comparatively increase for intra frame coded quantized data, as compared with inter frame coded quantized data as shown in FIG. 8.

Figure 9:
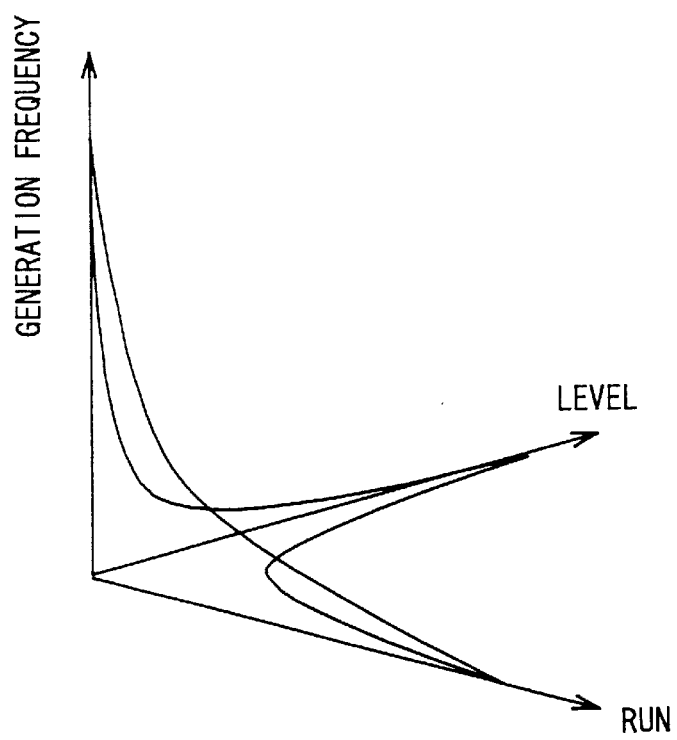
FIG. 9 is a frequency distribution diagram showing the generation frequency of quantized data obtained by inter frame coding.

For the inter frame coded quantized data is scattered up to a high frequency component because a difference with the pattern of other frame is discrete cosine transformed as shown in FIG. 9. Therefore, a run length tends to comparatively increase and a level tends to comparatively decrease for inter frame coded quantized data, as compared with intra frame coded quantized data.

The VLC table 23C for intra frame coding and VLC table 23D for inter frame coding are the coding tables assigned with symbols, that is, signs so that the symbol length of quantized data can be efficiently decreased by reflecting the above composition.

The quantized data S2 to be variable length coded here is obtained by quantizing a DCT coefficient transformed by the scan procedure shown in FIGS. 10A to 10D no matter when the data is coded by any coding method.

In general, the quantized data S2 is formed in accordance with a combination of 0-run length with a quantized data level (that is, run and level) as shown in FIGS. 11A to 11C. However, when the entire quantized data remaining without being scanned is 0, it is notified to the quantized data S2 by sending end of block (EOB) code that there is no level other than 0 up to finally coded quantized data.

FIGS. 12 and 13 show the VLC table 23D for inter frame coding prepared for the quantized data S2 expressed by the format and FIGS. 14 and 15 show the VLC table 23C for intra frame coding. In FIGS. 12 and 14, the central column shows run length values and the right column shows level values. And, codes assigned to combinations of run lengths with levels are shown in the left column.

From FIG. 12, it is found that in case of the VLC table 23D for inter frame coding, a symbol with a small bit length is assigned to quantized data with a relatively high generation frequency and a large run length. This is also found from FIG. 13 showing the relationship between actually assigned symbol length and combination of a run length with a level.

In other words, this is also found from the fact that a symbol or sign with the length of 9 bits is assigned to the quantized data with the run length of "0" and the level of "5" but only a sign with the length of 6 bits is assigned to the quantized data with the run length of "4" and the level of "1".

In this connection, the bit length shown in FIG. 13 is a value obtained by adding one bit to the code length of the VLC table 23D for inter frame coding shown in FIG. 12.

The VLC table 23D for inter frame coding assigns a code with the symbol length of 20 bits to quantized data of a combination with a relatively low generation frequency instead of assigning a sign so as to fixed length code the quantized data. In this case, six bits of the above 20 bits are assigned to "ESCAPE code", six bits of the 20 bits are assigned to "run length", and the remaining eight bits of the 20 bits are assigned to "level".

From FIG. 14, it is found that in case of the VLC table 23C for intra frame coding a sign with a small bit length is assigned to quantized data with a relatively high generation frequency and a low level. This is also found from FIG. 15 showing the relationship between each combination and a sign length actually assigned to each combination.

In other words, this is also found from the fact that a sign with the length of 6 bits is assigned to quantized data with the run length of "0" and the level of "5" but only a sign with the length of 7 bits is assigned to quantized data with the run length of "4" and the level of "1".

Also in the case of FIG. 15, the bit length assigned for a combination of a run length with a level is a value obtained by adding one bit to the code length of the VLC table 23C for intra frame coding shown in FIG. 14.

The VLC table 23C for intra frame coding assigns a code with the symbol length of 22 bits to quantized data of a combination with a relatively low generation frequency instead of assigning a sign so as to fixed length code the quantized data. In this case, eight bits of the above 22 bits are assigned to "ESCAPE code", six bits of them are assigned to "run length", and eight bits of them are assigned to "level".

(1-4) Constitution of decoder

The following is the description of the constitution of a decoder for restoring a motion picture from a bit stream coded by the encoder 20 and transmitted through a transmission path or media.

Figure 16:
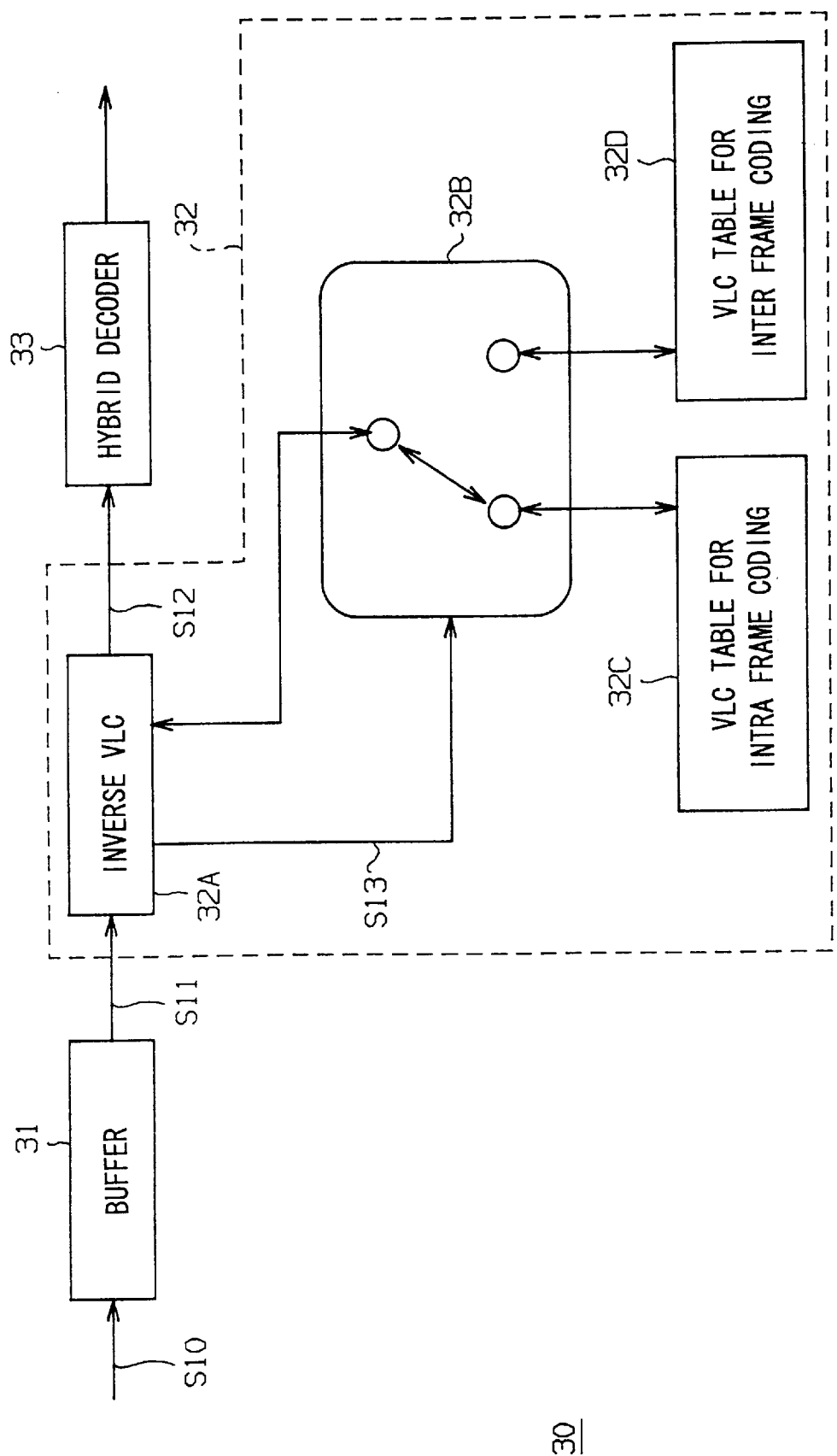
FIG. 16 is a block diagram showing an embodiment of the decoding system using the variable length decoding apparatus of this invention.

In FIG. 16, 30 represents a decoder constituting a motion picture decoding device as a whole. The decoder 30 temporarily stores a bit stream S10 inputted from media or the like in a receiving buffer memory 31 and successively inputs it to an inverse variable length coding (inverse VLC) section 32 at a predetermined timing.

The inverse VLC section 32 inverse VLC codes the information related to movement compensation of header information included in a bit stream S11 with an inverse VLC circuit 32A and thereafter supplies restored results to a table changer 32B as a motion compensation mode signal S13.

In this case, the table changer 32B selects the VLC table 32C for intra frame coding as an inverse transform table when the motion compensation mode of a macroblock to be processed is a intra frame coding mode but selects the VLC table 32D for inter frame coding as an inverse transform table when the motion compensation mode is an inter frame coding mode.

The inverse VLC circuit 32A refers to the inverse coding table thus selected by the table changer 32B to inverse VLC code a DCT coefficient and run length inputted as the bit stream S11.

A hybrid decoder 33 inputs from inverse VLC circuit 32A the DCT coefficient and run length information of the motion compensation predicted error signal obtained for the macroblock layer and decoded data S12 of the motion vector and motion compensation mode, etc.

The hybrid decoder 33 restores picture data by decoding highly efficiently coded data according to a procedure inverse to that of the hybrid coder 22.

(1-5) Constitution of hybrid decoder

Figure 17:
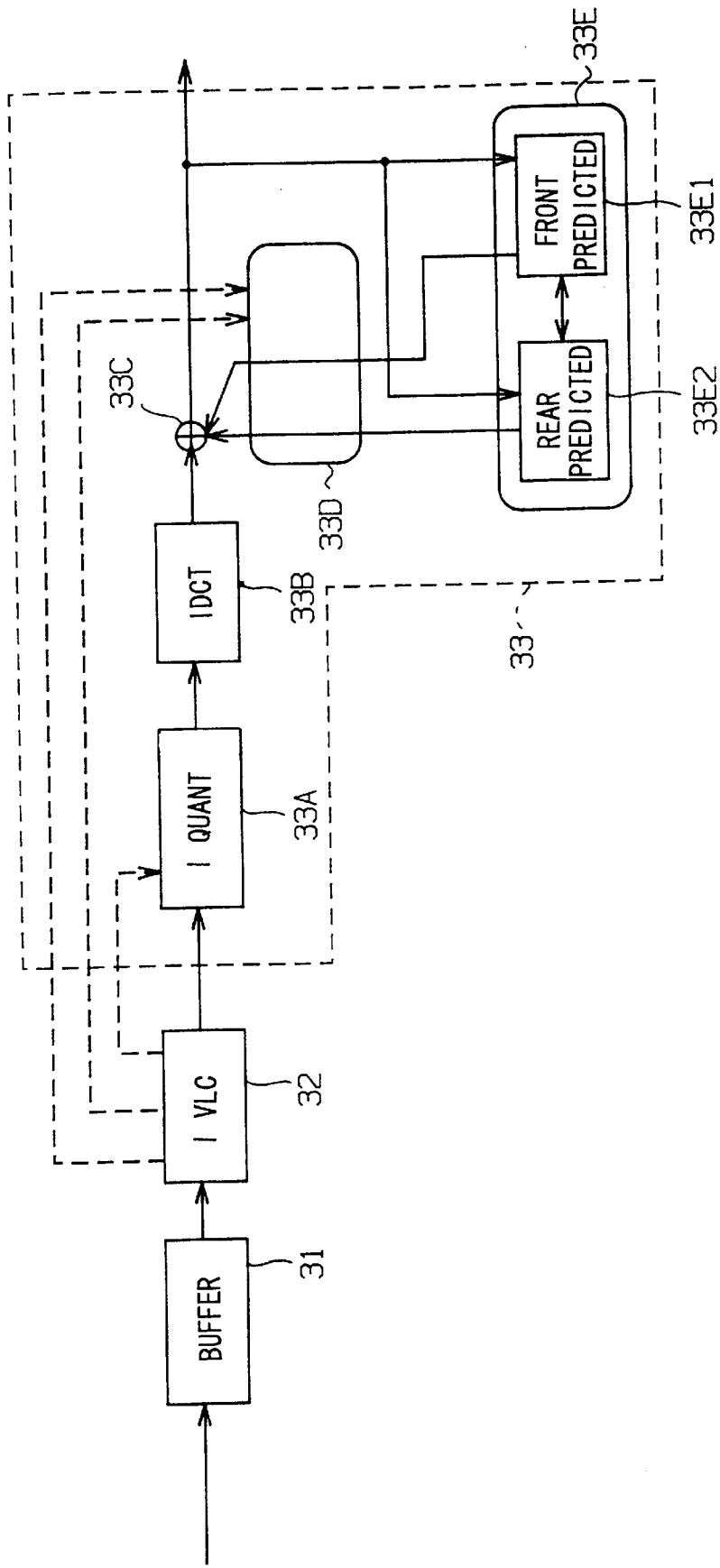
FIG. 17 is a block diagram showing a hybrid decoder.

The internal structure of the hybrid decoder 33 is described below by referring to FIG. 17.

The hybrid decoder 33 sends a quantized step and picture data of the variable length coded data inputted from the inverse VLC section 32 to an inverse quantizer 33A and also sends a motion vector, predicted mode, predicted flag, and DCT flag to a motion compensation circuit 33D.

The inverse quantizer 33A inversely quantizes the picture data supplied from the inverse VLC apparatus 32 in accordance with the quantized step similarly supplied from the inverse VLC section 32 and supplies the data to an inverse discrete cosine transform (IDCT) circuit 33B.

The IDCT circuit 33B inverse DCT transforms a DCT coefficient inputted from the inverse quantizer 33A to supply restored differential data to an operating unit 33C.

The operating unit 33C restores an original picture by adding the output of the IDCT circuit 33B to the data motion compensated by the motion compensation circuit 33D.

The picture data thus outputted from the computing unit 33C is outputted to an output terminal and also it is stored in a frame memory 33E.

The frame memory 33E is provided with a front predicted picture memory section 33E1 and a rear predicted picture memory section 33E2. The front predicted picture memory section 33E1 stores a predicted picture and an intra picture for generating a bidirectional picture and the rear predicted picture memory section 33E2 stores a predicted picture for generating a predict picture or bidirectional picture.

The motion compensation circuit 33D compensates the motion of picture data stored in the front predicted picture section 33E1 and rear predicted picture section 33E2 and sends the data to the computing unit 33C in accordance with a mode of the picture data to be decoded.

(1-6) Coding and decoding

The following is the description of coding by a motion picture coding section for successively coding motion pictures in accordance with a predetermined procedure with the above constitution.

The motion picture coding section stores a motion picture converted into digital data by a pre-processing circuit 2 (not shown) or the like in the encoder 20 of FIG. 5 through a frame memory 21 to highly efficiently encode the digital data.

The encoder 20 of FIG. 5 hybrid codes the picture data read from the frame memory 21 with the hybrid coder 22 and sends the quantized data which is motion compensated and DCT transformed and thereafter quantized to the VLC section 23.

The VLC section 23 of FIG. 5 variable length codes by changing the VLC table 23C for intra frame coding and the VLC table 23D for inter frame coding correspondingly to two types of coding modes.

Thus, the VLC section 23 variable length codes a transmission picture by using the VLC table 23C for intra frame coding for reflecting the generation frequency of intra frame coded quantized data when the picture comprises intra frame coded picture data but variable length codes the picture by using the VLC table 23D for inter frame coding for reflecting the generation frequency of inter frame coded quantized data when the picture is composed of inter frame coded picture data.

The above configuration makes it possible to further decrease the bit length of transformed and thereafter outputted picture data even though it is the quantized data coded by any coding system, compared with the existing case in which variable length coding is performed by using a VLC table for inter frame coding.

Thereby, it is possible to decrease the transmission rate for transmitting the same motion picture compared with the existing one and decrease the quantization step size by a value equivalent to the decrease of the transmission rate.

Thus, for the coding system of this embodiment, it is possible to increase information content to be assigned to each pixel by a value equivalent to the decrease of the quantized size and further improve the picture quality compared with the existing one.

Moreover, because it is possible to use an existing coding table for the VLC table 23D for inter frame coding of this embodiment, the compatibility with existing models is also compensated.

In this connection, because the information about whether to perform intra frame or inter frame coding every macroblock is sent together with picture data even for an existing coding system, it is not necessary to newly add the information about which VLC table should be used to header information.

(2) Second Embodiment (2-1) Constitution of Encoder

Figure 18:
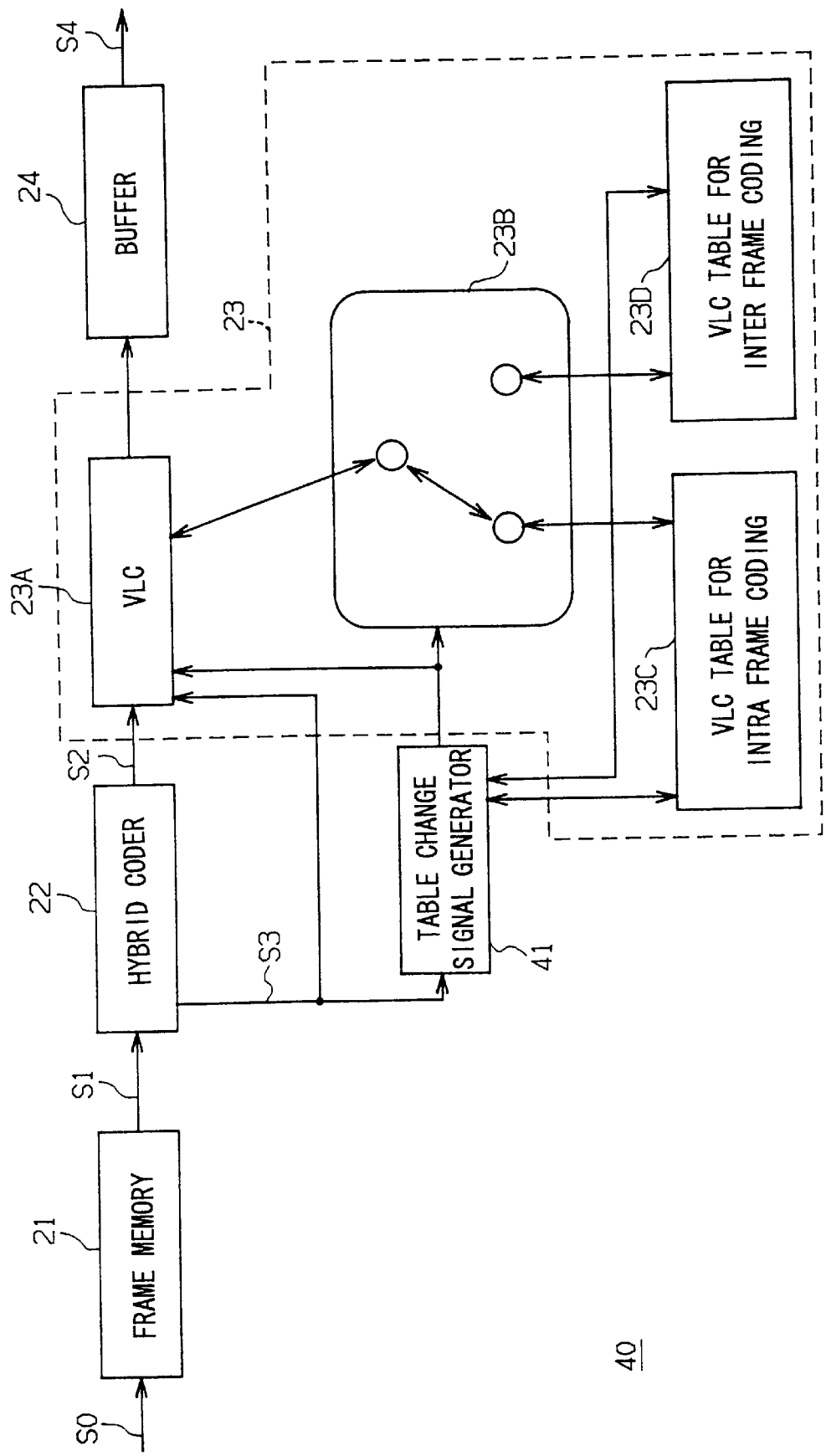
FIG. 18 is a block diagram showing an embodiment of the coding system using the variable length coding apparatus of this invention.

In FIG. 18 in which a portion corresponding to that in FIG. 5 is provided with the same symbol, symbol 40 represents an encoder constituting a motion picture coding system as a whole which has the same constitution as the encoder in FIG. 5 except a table change signal generator 41 for selecting a coding table requiring a small bit length regardless of a predicted coding system (frame type) by considering the information content generated by using each coding table in addition to the fact that two types of transform tables corresponding to a coding system are prepared as variable length coding tables.

Figure 19:
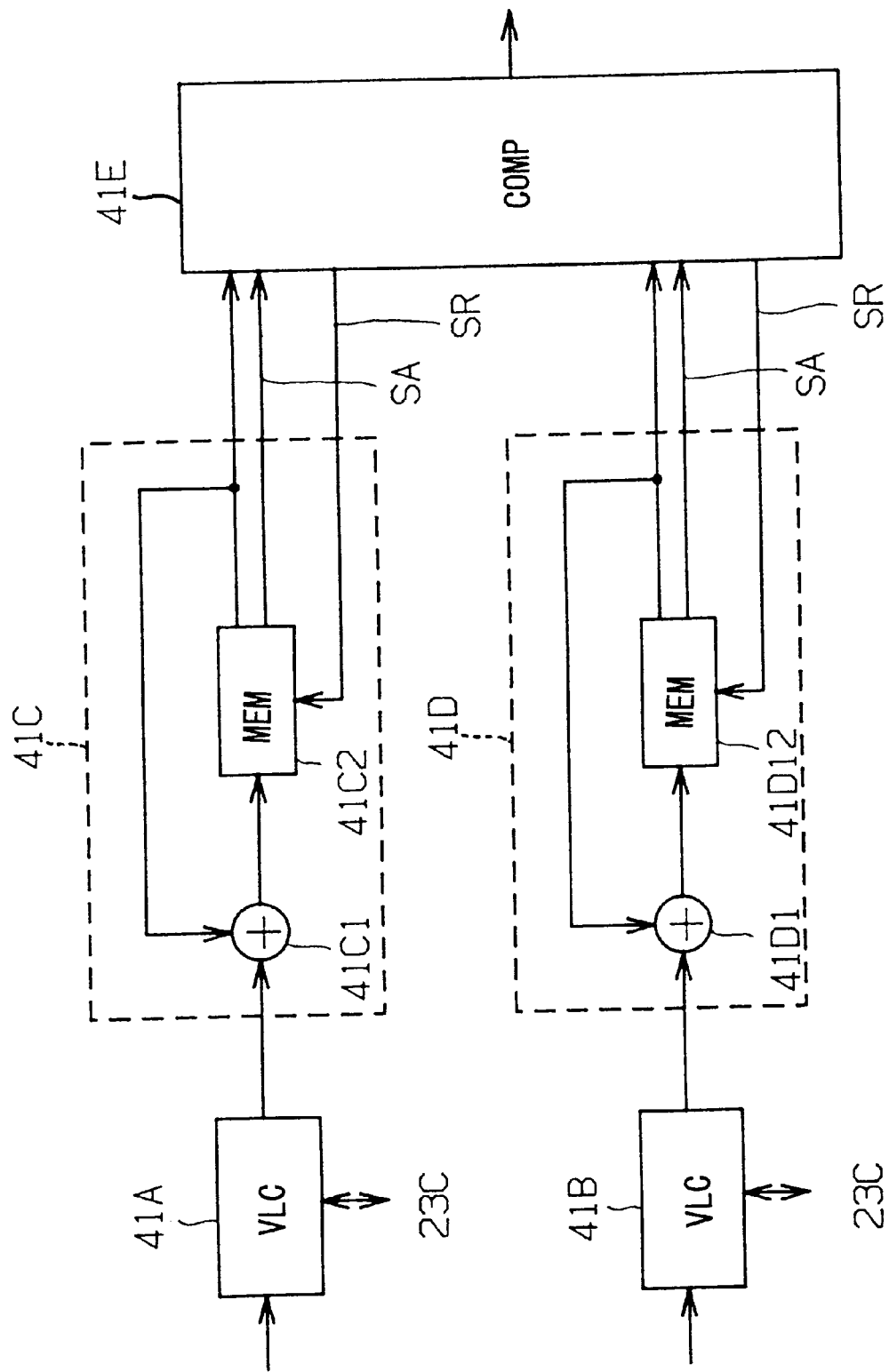
FIG. 19 is a block diagram showing a table change signal generator.

The table change signal generator 41 has the constitution shown in FIG. 19.

The table change signal generator 41 has two generated information counting sections to calculate the information content generated by using each transform table before starting variable length coding with the VLC apparatus 23.

The table change signal generator 41 inputs a DCT coefficient and run length information to two VLC circuits 41A and 41B from the hybrid coder 22 to variable length code quantized data with the VLC circuits 41A and 41B.

In this case, the VLC circuit 41A uses the VLC table 23C for intra frame coding as a coding table and the VLC circuit 41B uses the VLC table 23D for inter frame coding as a coding table.

The data variable length coded by the VLC circuit 41A and the data variable length coded by the VLC circuit 41B are sent to the number of bits counters 41C and 41D respectively where the number of bits representing the generated information content is counted. In this case, the number of bits counters 41C and 41D update the generated information content stored in memories 41C2 and 41D2 by sequentially adding the number of bits of newly coded variable length data to the number of bits stored in the memories 41C2 and 41D2 with adders 41C1 and 41D1.

A comparator 41E sends a data request signal SR to the memories 41C2 and 41D2 in order to compare the information content generated in macroblocks and compares the number of bits stored in the memory 41C2 with that stored in the memory 41D2 at the timing when a response signal SA representing that the number of bits of all macroblocks is requested from the memories 41C2 and 41D2 is inputted.

The comparator 41E shown in FIG. 19 and included in the table change signal generator 41 shown in FIG. 18 outputs the comparison result to the VLC circuit 23A and table changer 23B of the VLC apparatus 23 shown in FIG. 18 as a table change signal. Thereby, the comparator 41E selects for the VLC circuit 23A a coding table with which variable length coding should be performed and changes the connection of the table changer 23B.

Figure 20:
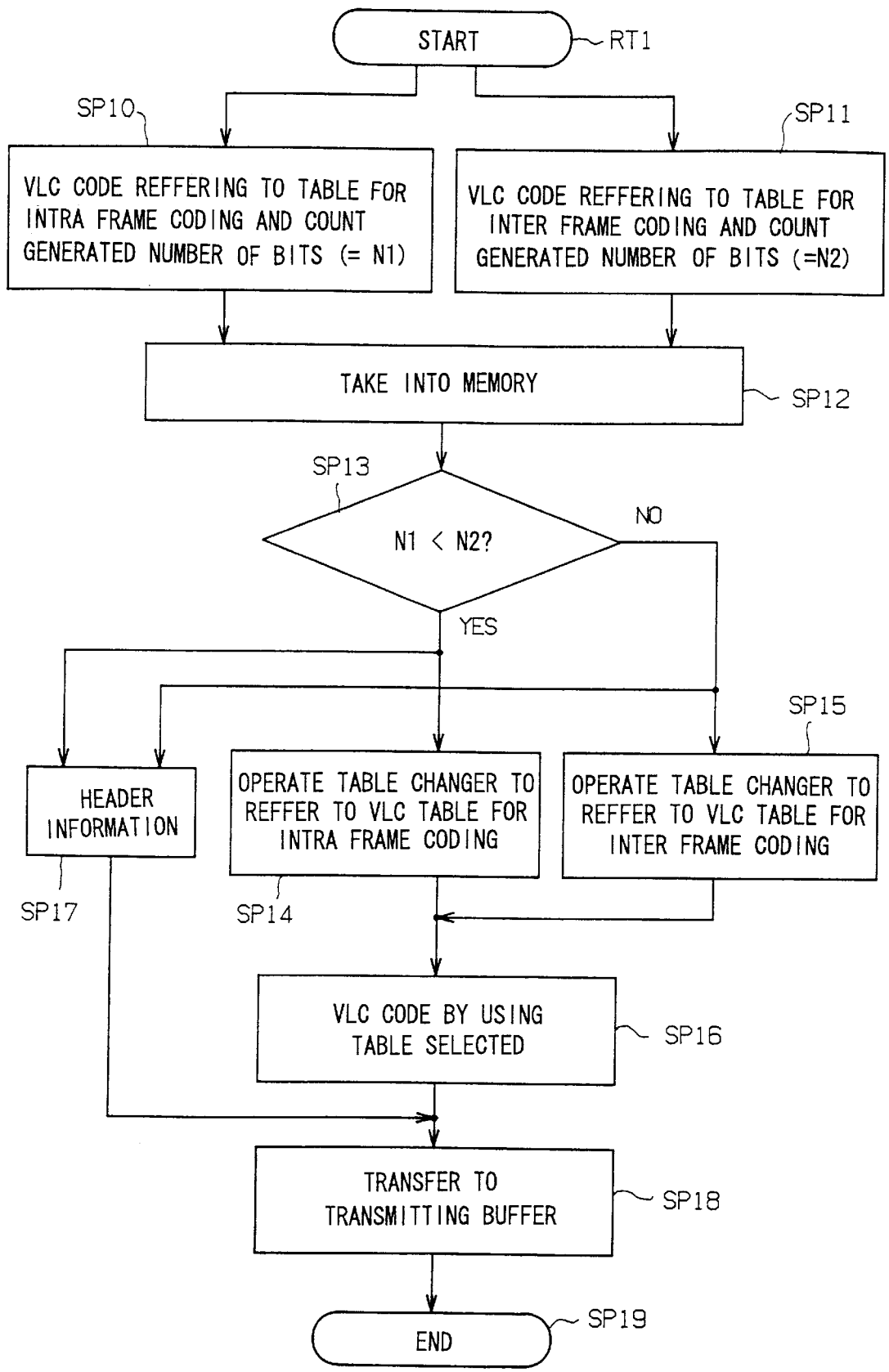
FIG. 20 is a flow chart for explaining a variable length coding procedure.

Processing by the encoder 40 is described by referring to FIG. 20.

The encoder 40 starts the processing of a processing routine RT1 when the processing by the hybrid coder 22 terminates and quantized data is obtained and then starts the processing in the steps SP10 and SP11. In the steps SP10 and SP11, the table change signal generator 41 counts the generated number of bits Ni when variable length coding quantized data by using the VLC table 23C for intra frame coding and the generated number of bits N2 when variable length coding quantized data by using the VLC table 23D for inter frame coding in order.

When counting of the generated number of bits N1 and the generated number of bits N2 for each macroblock terminates, the table change signal generator 41 starts the next step SP12 to store the number of bits in a memory and determine a counted value.

The table change signal generator 41 decides a coding table for coding with which the generated number of bits is minimized in the next step SP13 (actually, comparison is performed by the comparator 41E).

When the table change signal generator 41 decides that the generated number of bits is minimized by the VLC table 23C for intra frame coding, it starts the step SP14 to control the table changer 23B so as to refer to the VLC table 23C for intra frame coding according to a change signal.

However, when the table change signal generator 41 decides that the generated number of bits is minimized by the VLC table 23D for inter frame coding, it starts the step SP15 to control the table changer 23B so as to refer to the VLC table 23D for inter frame coding according to a change signal.

When these changes terminate, the step SP16 is started and the VLC circuit 23A starts variable length coding the quantized data having a DCT coefficient and a run length fetched from the hybrid coder 22.

Moreover, the VLC circuit 23A adds a flag for designating the coding table used for variable length coding in the step SP17 to header information as control data.

In the step SP18, the VLC circuit 23A transfers variable length coded picture data to a buffer memory 24 for transmission together with the header information to temporarily store them and then writes the stored data in a transmission path or media from the buffer memory 24 to terminate the above coding.

(2-2) Constitution of Decoder

Figure 21:
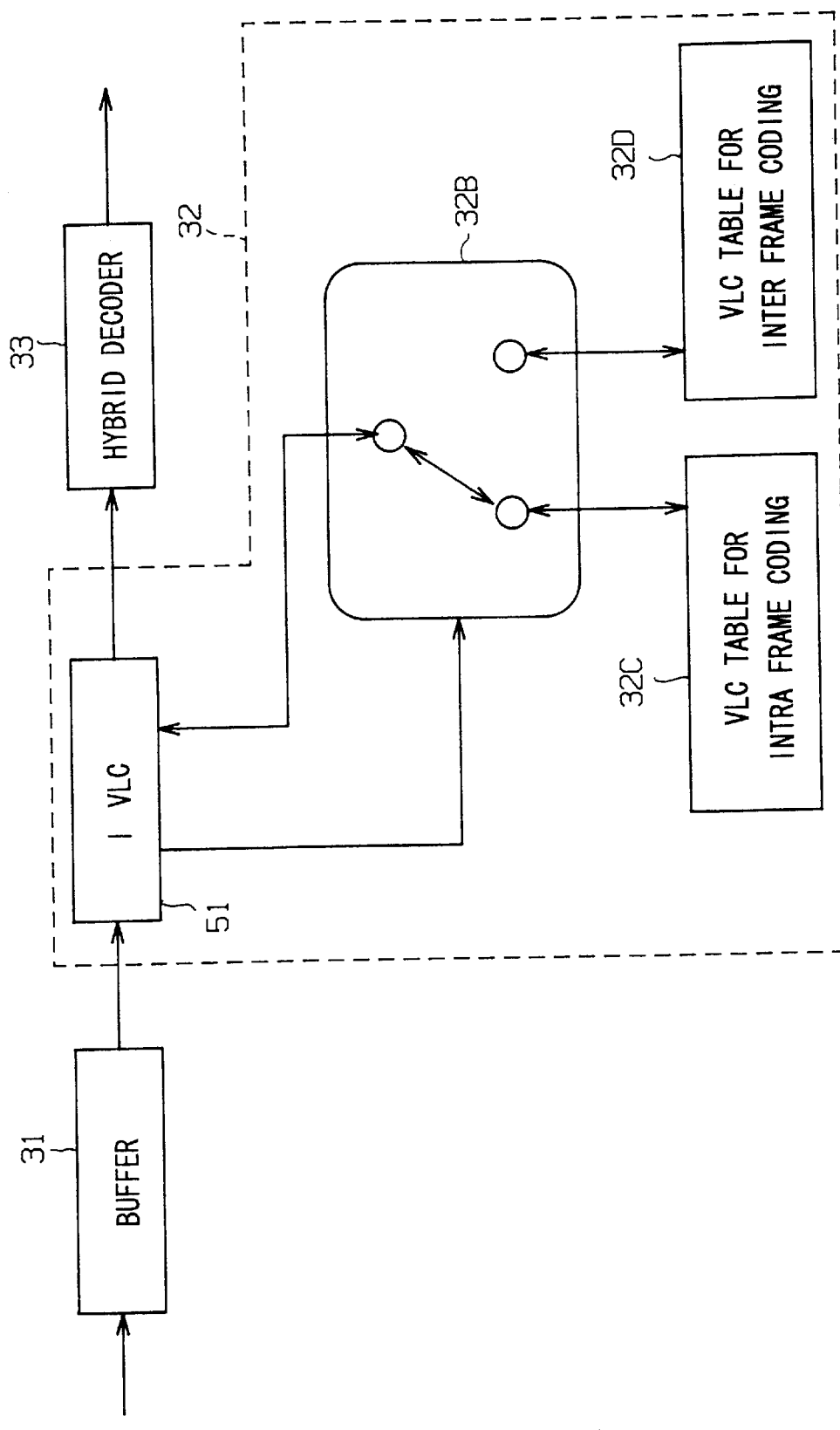
FIG. 21 is a block diagram showing an embodiment of the decoding apparatus of the variable length coding of this invention.

The constitution of a decoder for decoding picture data highly efficiently coded by the encoder 40 is described below by referring to FIG. 21. In FIG. 21 in which a portion corresponding to that in FIG. 16 is indicated by the same symbol, symbol 50 represents a decoder which has the same constitution as that in FIG. 16 except that an inverse VLC circuit 51 is used instead of the inverse VLC circuit 32A of the inverse VLC section 32.

The inverse VLC circuit 51 inversely VLC codes header information to extract a flag showing the coding table selected in variable length coding among the transform results and uses the flag to change the table changer 32B.

As the result of the above change, the inverse VLC circuit 51 refers to the coding table selected by the table changer 32B to inversely VLC code a DCT coefficient and run length information inputted as bit streams.

(2-3) Coding and Decoding

The following is the description of coding performed by a motion picture coding system for successively coding motion pictures according to a predetermined procedure with the above constitution.

The motion picture coding system stores a motion picture converted into digital data by the preprocessing circuit 2 or the like in the encoder 40 through the frame memory 21 to highly efficiently code the data with the encoder 40.

The encoder 40 hybrid codes the picture data read from the frame memory 21 with the hybrid coder 22 and sends the quantized data which is motion compensated and DCT transformed and thereafter quantized to the VLC apparatus 23.

In this case, the same quantized data as is sent to the VLC apparatus 23 is also inputted to the table change signal generator 41 to select a coding table for minimizing the generated information content for variable length coding.

This is because intra frame coded quantized data of a macroblock includes data with a composition very close to inter frame coded quantized data of the macroblock and data with a composition not very close to it and therefore intra frame coded quantized data cannot be always transformed into smaller number of bits by using a VLC table for intra frame coding.

Therefore, intra frame coded quantized data of a macroblock with a composition very close to inter frame coded quantized data of the macroblock is variable length coded by using the VLC table 23D for inter frame coding and macroblocks other than the above macroblock are variable length coded by using the VLC table 23C for intra frame coding. Thereby, it is possible to further improve the coding efficiency for variable length coding.

In this case, because a coding table used for variable length coding does not depend on an intra frame coding system or inter frame coding system in general, it is necessary to code and transmit the information showing which VLC table is used for variable length coding together with variable length coded data.

Therefore, a VLC table formed by adding one bit to each macroblock is used.

The above constitution makes it possible to realize a variable length coding system with higher variable length coding efficiency than the existing one by variable length coding data with a composition close to quantized data generated through inter frame coding by using a VLC table for inter frame coding even when variable length coding quantized data generated through intra frame coding and selecting either of two coding tables for further decreasing generated information content for each block.

Therefore, it is possible to decrease the transmission rate for transmitting the same motion picture compared with the existing one and decrease the quantizing step size by a value equivalent to the decrease of the coding rate. Thus, the coding system of this embodiment makes it possible to increase the information content to be assigned to each pixel compared with an existing coding system which has only one VLC table and further improve the picture quality.

Moreover, though this variable length coding system requires additional information of one bit for each macroblock, generated information content can be decreased because it is possible to make the decrease rate of the number of bits larger than the increase rate of the number of bits for additional information by properly changing VLC tables.

(3) Other Embodiments

In the above embodiment, a video signal transmission system used for a video conference system and visual telephone system is described. However, this invention is not restricted to the system but it can be widely applied to a system using various types of recording and reproducing systems and a system using transmitting and receiving systems.

Moreover, in the above embodiment, a case is described in which the quantized data obtained from picture data is variable length coded. However, this invention is not restricted to the case but it can be widely applied to cases for variable length coding the quantized data obtained from other data such as voice data.

Furthermore, in the above embodiment, a case is described in which two variable length coding tables are prepared correspondingly to data which is intra framed coded and thereafter quantized and data which is inter frame coded and thereafter quantized. However, this invention is not restricted to the case but it can be applied to a case in which three or more variable length coding tables assigned with different sign lengths are prepared.

Furthermore, in the above embodiment, a case is described in which intra frame coded or inter frame coded picture data is discrete cosine transformed. However, this invention is not restricted to the case but it can be widely applied to cases for transforming the data with any other orthogonal coding system.

Furthermore, in the above embodiment, a case is described in which quantized data is variable length coded in macroblocks.

However, this invention is not restricted to the case but it can be widely applied to cases for using a block with any size as the processing unit.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A method for variable length coding of a macroblock of quantized input data, comprising the steps of:

determining a coding mode used to produce said macroblock;

selecting one of a plurality of variable length coding tables as a function of said coding mode to provide a selected variable length coding table; and variable length coding said macroblock using the selected variable length coding table.

2. The method of claim 1, wherein said coding mode is one of intra frame predictive coding and inter frame predictive coding.

3. The method of claim 2, wherein said plurality of variable length coding tables comprises an intra frame variable length coding table and an inter frame variable length coding table.

4. The method of claim 1, wherein each of said variable length coding tables comprises variable length codes for more frequently occurring symbols and fixed length codes for less frequently occurring symbols.

5. The method of claim 1, further comprising the steps of orthogonally transforming input data to produce orthogonally transformed input data, and quantizing the orthogonally transformed input data to produce said quantized input data.

6. An apparatus for variable length coding of a macroblock of quantized input data, comprising:

means for determining a coding mode used to produce said macroblock;

means for selecting one of a plurality of variable length coding tables as a function of said coding mode to provide a selected variable length coding table; and means for variable length coding said macroblock using the selected variable length coding table.

7. The apparatus of claim 6, wherein said coding mode is one of intra frame predictive coding and inter frame predictive coding.

8. The apparatus of claim 7, wherein said plurality of variable length coding tables comprises an intra frame variable length coding table and an inter frame variable length coding table.

9. The apparatus of claim 6, further comprising means for orthogonally transforming input data to produce orthogonally transformed input data, and means for quantizing the orthogonally transformed input data to produce said quantized input data.

10. A method for variable length decoding of an encoded macroblock, comprising the steps of:

extracting a coding mode from said encoded macroblock;

selecting one of a plurality of variable length coding tables as a function of said coding mode to provide a selected variable length coding table; and variable length decoding said encoded macroblock using the selected variable length coding table to produce a variable length decoded macroblock.

11. The method of claim 10, wherein said coding mode is one of intra frame predictive coding and inter frame predictive coding.

12. The method of claim 10, further comprising the steps of inverse quantizing the variable length decoded macroblock to produce an inverse quantized macroblock, and inverse orthogonally transforming the inverse quantized macroblock.

13. An apparatus for variable length decoding of an encoded macroblock, comprising:

means for extracting a coding mode from said encoded macroblock;

means for selecting one of a plurality of variable length coding tables as a function of said coding mode to provide a-selected variable length coding table; and means for variable length decoding said encoded macroblock using the selected variable length coding table to produce a variable length decoded macroblock.

14. The apparatus of claim 13, wherein said coding mode is one of intra frame predictive coding and inter frame predictive coding.

15. The apparatus of claim 13, further comprising means for inverse quantizing the variable length decoded macroblock to produce an inverse quantized macroblock, and means for inverse orthogonally transforming the inverse quantized macroblock.

* * * * *